United States Patent [19]

Karpis

[11] Patent Number: 4,545,401

[45] Date of Patent: Oct. 8, 1985

[54] FLUID FLOW REGULATOR

[76] Inventor: John J. Karpis, The Toledo Apt. #4, Long Beach, Calif. 90803

[21] Appl. No.: 425,772

[22] Filed: Sep. 28, 1982

[51] Int. Cl.$^4$ ............................................. F16K 31/38
[52] U.S. Cl. ................................ 137/487; 137/116.5; 137/489
[58] Field of Search ............ 137/486, 487, 489, 116.3, 137/116.5, 115

[56] References Cited

U.S. PATENT DOCUMENTS

| | | | |
|---|---|---|---|
| 2,395,941 | 3/1946 | Rockwell | 137/115 X |
| 2,808,068 | 10/1957 | Thomas | 137/116.5 X |
| 3,143,134 | 8/1964 | Karpis | 137/486 |
| 3,774,629 | 11/1973 | Enomoto | 137/116.3 |

Primary Examiner—Martin P. Schwadron
Assistant Examiner—S. Hepperle
Attorney, Agent, or Firm—Jones, Tullar & Cooper

[57] ABSTRACT

A fluid flow regulator including a servo valve assembly and a throttle valve assembly. The servo valve assembly includes a pair of double acting actuators, biased in one direction by an adjustable spring, contoured ports and piping passageways to the ports and to other chambers of the assembly. The actuators are effectively connected together and function to oppose each other. The chambers formed between the two actuators and the respective cylinder chambers formed on the exterior ends of each actuator are used for pressure sensing purposes. Each individual actuator may be comprised of up to three piston lands with adequate separation between to form chambers for fluid transfer purposes. Any leakage or servo flow entering these chambers would be communicated by passageways to appropriate interface ports on the regulator. Due to its sensitivity, the servo valve assembly effects a desired action by variably restricting the flow or pressure in a passageway controlled by the throttle valve assembly. This result is achieved by throttle valve control.

12 Claims, 7 Drawing Figures

FLUID FLOW REGULATOR

BACKGROUND OF THE INVENTION

1. Field of the Invention

The present invention relates to a device for regulating fluid pressure and/or flow. These devices are generally referred to as fluid flow regulators. The pressure regulators will regulate flow to maintain a desired set pressure level or magnitude. The flow regulators, in turn, regulate pressure to maintain set fluid flowrates.

2. Prior Art

Heretofore, regulators used thin membrane devices such as diaphragms or bellows for pressure level sensing purposes to initiate required operational action. Because of their structural strength, these membrane devices effectively limit such regulators to process applications which operate at low or moderate pressure levels. Additionally, these membranes are usually subjected to relatively high fatigue stresses because of their flexing mode of operation and are generally the chief cause of regulator failure.

An example of such a regulator is disclosed in my U.S. Pat. No. 3,143,134.

OBJECTS AND SUMMARY OF THE INVENTION

It is an object of the present invention to provide a fluid regulator which can reliably provide accurate, sensitive and responsive regulation and can be used in exceptionally high pressure process applications;

It is a related object of the present invention to provide a fluid regulator which is readily adaptable for use as a flow regulator and a back pressure regulator.

The present invention essentially comprises two major sub-assemblies and a combination of such sub-assemblies. The sub-assemblies comprise, respectively, a first means sensitive to and operative by fluid pressure conditions to effect restricting the servo flow from a first passageway connected to a second means and thereby operating and controlling the second means to effect a desired action by variably restricting the flow or pressure in a second passageway. The first means hereafter is referred to as the servo valve assembly and the second means is referred to as the throttle valve assembly.

The servo valve assembly is basically comprised of a pair of double acting actuators, a spring, a spring adjusting means, contoured ports and piping passageways to the noted ports and to other chambers of the assembly. The actuators, each with slightly different effective areas, are housed in close fitted cylinder bores and are effectively connected together and function to oppose each other. The chambers formed between the two actuators and the respective cylinder chambers formed on the exterior ends of each actuator are used for pressure sensing purposes. Each individual actuator may be comprised of up to three piston lands with adequate separation between to form chambers for fluid transfer purposes. Any leakage or servo flow entering base chambers would be communicated by passageways, interconnected or otherwise, to appropriate interface ports on the regulator. Subsequent connection to these interface ports would depend upon the application and the operating fluid used:

for applications using air or other environmentally compatible fluids capable of being expended into the atmosphere, individual passageways, each terminating at appropriate exhaust ports, could be used to drain and dispose the leakage and servo flow from the respective chambers.

For liquid applications, interconnecting passageways terminating at a single interface port could be used. External piping would be necessary to transport the leakage and servo flows to a vented tank or to some other low pressure source.

DETAILED DESCRIPTION OF THE PREFERRED EMBODIMENTS

Figure 1:
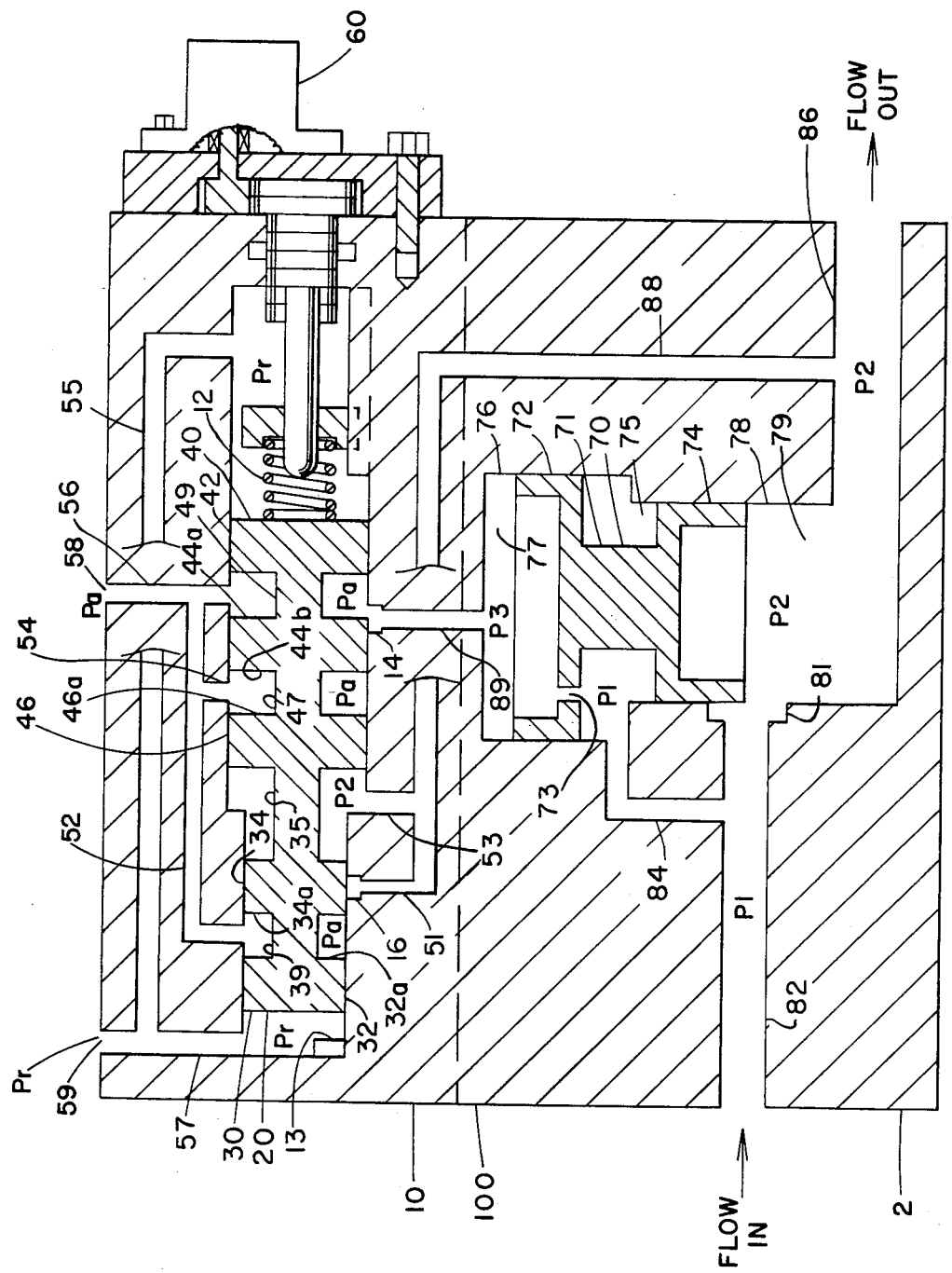
FIG. 1 is a cross-sectional schematic view through a basic fluid pressure regulator according to the present invention.

In FIG. 1, servo valve assembly 10 is comprised of servo valve 20, spring 12, spring adjustment means 60, servo port 14, relief port 16, and piping passageways provided or installed in regulator body 2 as shown. Servo valve 20 is comprised of actuator 30 connected by rod 35 to actuator 40. Actuator 30 is itself comprised of piston land 32 connected by rod 39 to piston land 34. Actuator 40 is comprised of piston lands 42, 44 and 46 connected by rods 49 and 47 respectively, as shown. The chambers formed between the respective piston lands of the two actuators are interconnected by passageways 52, 54 and 56 and terminate at an interface leakage port 58. The external chambers of the two actuators are interconnected by passageways 55 and 57 and terminate at the interface reference pressure port 59. The chamber formed between actuators 30 and 40 is interconnected with relief port 16 and passageway 86 of the throttle valve assembly 100 by passageways 51, 53 and 88. The servo port 14 is interconnected with chamber 77 of the throttle valve assembly 100 by passageway 89 as shown.

Consider that a pressure source P2 is applied to the chamber between the two actuators 30 and 40 and that it is at a higher level than the pressure source Pr connected to interface leakage port 59, which is applied into the exterior chambers of both actuators. Also consider that pressure source Pa is connected to leakage port 58 and is applied into the connected chambers formed between the respective piston lands of each actuator. With servo valve 20 arranged as shown in FIG. 1, i.e., with spring 12, compressed at a fixed deflection setting, applying a mechanically developed force on piston 42 of the larger actuator 40, and with pressure sources applied to the respective chambers noted above, an equation describing the forces acting on servo valve 20 would be as follows:

$$PrA1 - PaA2 + PaA2 - P2A3 + P2A4 - PaA5 + PaA5 - PaA6 + PaA6 - PrA7 - FS = 0$$

WHERE:

Pr = Fluid pressure applied in the external chambers of actuators 30 and 40
Pa = Fluid pressure applied in the chambers between the pistons of respective actuators 30 and 40
P2 = Fluid pressure applied in the chamber between actuators 30 and 40
A1 = Effective area of piston 32 exposed in the external chamber of actuator 30
A2 = Effective areas of pistons 32 and 34 exposed in the chamber between said pistons
A3 = Effective area of piston 34 exposed in the chamber between actuators 30 and 40
A4 = Effective area of piston 46 exposed in the chamber between actuators 30 and 40
A5 = Effective areas of pistons 46 and 44 exposed in the chamber between the said pistons
A6 = Effective areas of pistons 44 and 42 exposed in the chamber between the said pistons
A7 = Effective area of piston 42 exposed in the external chamber of actuator 40
FS = Spring force applied by spring 12
Combining and rearranging, the equation reduces to:

$$FS = P2(A4 - A3) - Pr(A7 - A1)$$

considering that the respective piston areas are mechanically constant, the equation can be characterized as:

$$FS = aP2 - bPr$$

It thus can be seen that servo valve stability is achieved by the proper relationship of the spring force and the two pressure sources Pr and P2. If the pressure regulator is referenced to atmosphere, i.e., Pr is atmospheric pressure, the equation can be further characterized as:

$$FS = aP2 - k$$

Any change in the two variables, FS and P2, would unbalance the servo valve's equilibrium and would cause it to move. The amount of movement due to a change in pressure P2 may be determined from:

$$\text{Movement} = \frac{\text{unbalanced force}}{\text{spring rate of spring}} = \frac{a(\Delta P2)}{\text{spring rate of spring}}$$

where: $\Delta P2$ = the change in pressure level P2 from one instant to another.

This indicates that the sensitivity of the servo valve 20 is dependent only upon the characteristics of spring 12. In comparison, regulators using diaphragms, bellows or similar functioning items must additionally include the spring rates of such components to that of the spring in any movement equation pertaining to the particular regulators pressure sensing capabilities.

The opening area of servo port 14, contoured or otherwise, is restrictable by metering edge 44a of piston land 44. Thus any movement of servo valve 20 opens or closes servo port 14 and thereby can vary or control fluid flow from passageway 89.

It is thus shown that the servo valve assembly 10 is sensitive to the pressure level in passageway 86 and reacts to any variation in that level to vary the fluid flow from passageway 89.

The incorporation of relief port 16 and related passageway 51 provides a beneficial means of venting detrimental leakage flow from the communicated passageway 86 under certain operating conditions and will be described further hereinafter. In addition, a physical and functional relationship exists between relief port 16 and servo port 14. When metering edge 44a of actuator 40 is in line with and effectively covers or seals servo port 14, metering edge 34a of piston land 34 slightly covers, or, as a minimum is in line with the edge of, relief port 16. Functionally, relief port 16 is covered by piston land 34 before the servo port 14 is opened by piston land 44 when the servo valve is moving in that particular direction. Conversely, servo port 14 is covered before relief port 16 is opened when moving in the opposite direction.

The configuration of servo valve assembly 10 has a certain symmetry which enables it to be readily rearranged to create a new configuration which reverses the servo valves direction of motion for a like pressure change. As shown in FIG. 1, the application of pressure source Pr to the external chambers of actuators 30 and 40 and the application of the higher level pressure P2 to the chamber between the two actuators results in a developed force which would move the servo valve 20 to the right toward the larger actuator. If the application of the two pressure sources are reversed, i.e., P2 applied in the external actuator chambers and Pr in the chamber between the two actuators, the resultant force would move the servo valve to the left toward the smaller actuator. It should be apparent that an alternate servo valve could thus be created by relocating the biasing spring and related adjustment means to act on the smaller actuator and by relocating the servo and relief ports as necessary to function as required. The servo valve assembly shown in FIG. 2 uses this arrangement.

The utilization of the chambers between the respective pistons in each actuator provide a beneficial feature. These chambers intercept and exhaust any leakage passing the close fitted piston lands and prevent intermixing of the critical pressure sources P2, Pr and the pressure source in passageway 89, which will be subsequently identified as P3. This interception eliminates any inaccuracy in sensed pressure level that could result from such intermixing of pressure sources in any critical chamber having one of these applied sources.

Figure 2:
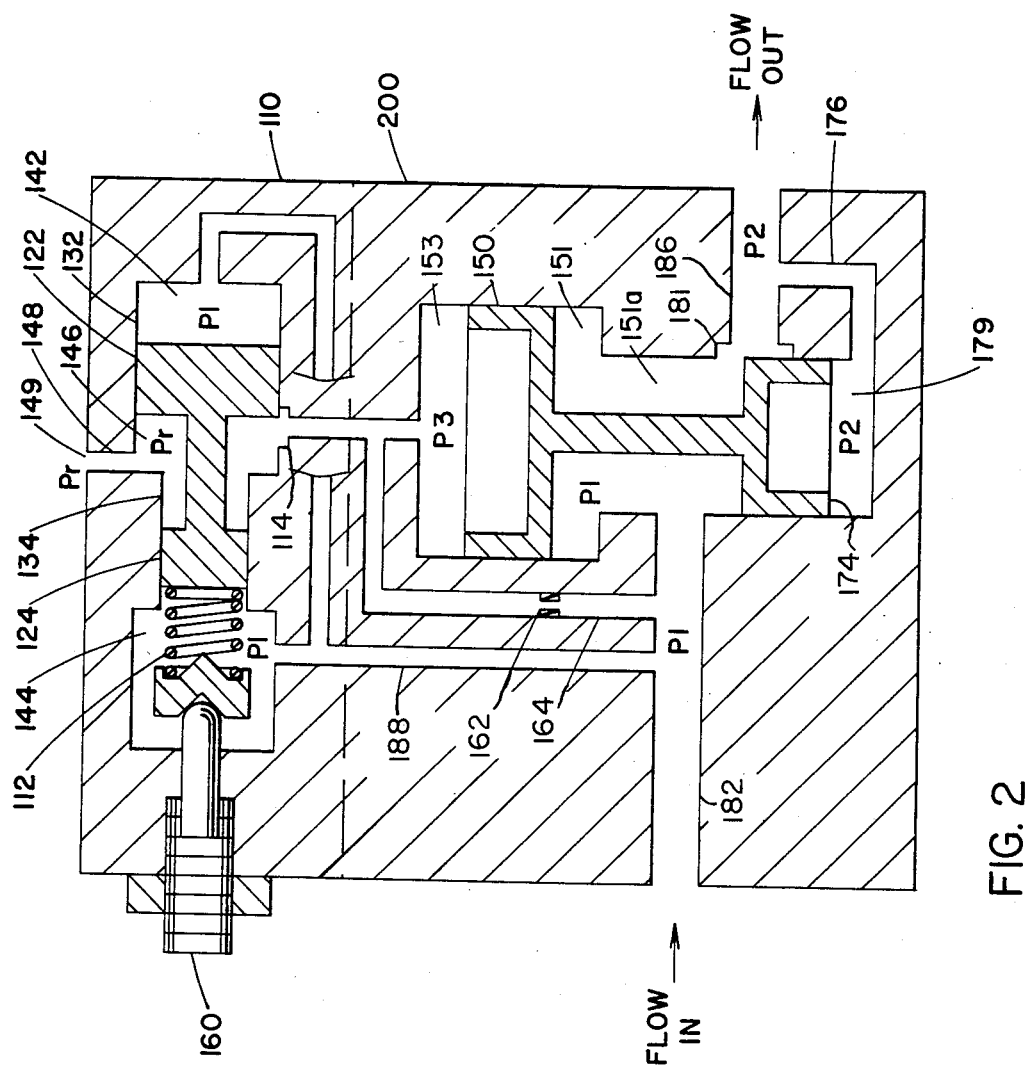
FIG. 2 is a cross-sectional schematic view through a back pressure regulator according to the present invention.

Many applications do not require regulators with the degree of accuracy possible with the design shown in FIG. 1. FIG. 2 shows schematically a more economic servo valve assembly configuration which, while not attaining in absolute terms the accuracy potential of the servo valve shown in FIG. 1, will provide similar objectives and regulating features.

With pressure sources applied as shown in FIG. 2, leakage will flow into chamber 146 from the exterior chambers 142 and 144 by passing through diametral clearances between each of the two piston lands 122 and 124 and their respective cylinder bores 132 and 134. Servo flow (to be subsequently identified) from the throttle valve assembly 200 enters chamber 146 through servo port 114. The volume of chamber 146 and the dimensions of passageway 148 and exhaust port 149 are sized and configured to drain and exhaust the combined leakage and servo flow without causing any significant pressure level rise in chamber 146 from that experienced in the external pressure source Pr.

It should be noted that, because of the labyrinth nature of close fitted pistons and bores, the leakage flowrate would be small and relatively constant over a wide range of levels between pressures P1 and Pr. Also, the nominal rate of servo flow during operation can be made relatively small since it is dependent upon sizing the orifice 162 in passageway 164 to attain a desired response of the throttle valve assembly which will be subsequently discussed.

THROTTLE VALVE ASSEMBLY

In FIG. 1, throttle valve assembly 100 is comprised of piston 70 installed in suitable closely fitted bores 76 and 78 of regulator body 2, a throttle port 81, an orifice 73 and related passageways. Piston 70 has two unequal diameter piston lands: a motor piston land 72 and a throttle piston land 74. The two piston lands are connected by a suitable rod 71. Throttle port 81 at the interior end of regulator inlet passageway 82 is opened and closed by the throttle piston land 74. Thus when fluid is supplied to the inlet passageway 82 at sufficient pressure and flow capacity, a flowrate is developed through any existing opening of the throttle port 81 and is controllable by any subsequent repositioning of throttle piston land 74. This flow then passes through valve chamber 79 to the exit passageway 86.

Passageway 84 communicates inlet passageway 81 to valve chamber 75 formed between piston lands 72 and 74. Orifice 73 is shown forming an opening in the wall of piston land 74 and thereby communicates chamber 75 with servo pressure chamber 77. This orifice could alternatively be placed in the piping passageway connecting the two chambers as illustrated in the back pressure regulator depicted in FIG. 2. This orifice allows fluid from the high inlet pressure source in chamber 75 to flow into chamber 77. Chamber 77, in turn is communicated with servo port 14 of servo valve assembly 10 by passageway 89 as previously noted.

It is apparent that if fluid flow, hereafter called servo flow, from chamber 77 is restricted in its escape through passageway 89, the pressure level in chamber 77 will approach that in chamber 75. The reverse is also true, i.e., if the flow is unrestricted through passageway 89, the pressure level in chamber 77 will be much lower than the inlet pressure in chamber 75. Orifice 73 is sized to attain a desired regulator response characteristic which is also dependent upon the characteristics of the fluid used, the mass of piston 70, the volume of valve chamber 77, the masses of servo valve 20 and spring 12 and the opening area characteristics of servo port 14.

For the purposes of the following discussion, the pressures existing in and around the throttle valve assembly are as follows:
P1=Inlet pressure of fluid entering passageway 82
P2=Pressure leaving through passageway 86
P3=Pressure of fluid in servo pressure chamber 77
Critical areas of piston 70 shown in FIG. 1 are as follows:
 A1=Effective area of throttle piston land 74
 A2=Effective area of motor piston land 72
 A3=Effective area of connecting rod 71
The forces acting on the throttle piston 70 are as follows:

$$P2A1 - P1(A1-A3) + P1(A2-A3) - P3A2 = 0$$

or $$P3A2 = P2A1 + P1(A2-A1)$$

Since areas A1 and A2 are constant because of their mechanical construction, it can be seen that piston 70 is moved or is stationary depending upon the relationship of the levels of the three pressures P1, P2 and P3. Any change in any of the pressures would unbalance the equalization forces acting on piston 70 and thus cause it to move in the direction of the resultant unbalanced force until one or both remaining two pressures are changed to again provide an equalization force on piston 70 such that the above equation is satisfied.

PRESSURE REGULATOR OPERATION

When passageway 88, interconnected with relief port 16 and the applicable servo valve chamber, is terminated and communicates with exit passageway 86, the pressure regulator illustrated in FIG. 1 will vary and control flow as necessary to maintain the flowrate exiting passageway 86 at a set or regulated pressure level as established by the force setting applied to actuator 40 by spring 12. The regulator may be considered to function in the following manner. Consider the following conditions exist:
 1. Reference pressure port 59 is suitably connected to a vented tank and communicates atmospheric pressure to the respective exterior chambers of actuators 30 and 40.
 2. Leakage port 58 is connected by separate piping means to a vented tank or to another system pressure source such that a pressure level less than or equal to that of the atmosphere is developed in the respective chambers between the piston lands of actuators 30 and 40 under all operating conditions.
 3. The residual compression of spring 12 positions servo valve 20 to be in physical contact with its travel stop 13 such that servo port 14 is fully opened and relief port 16 is fully closed.

Consider initial operation when fluid with sufficient flow capacity is suitably applied to inlet passageway 82. The initial surge of fluid passing through throttle port 81 causes the level of pressure P1 to increase in passageway 82 and in chamber 75. Two simultaneous actions result: First, piston 70 moves to fully open throttle port 81 and second, a servo flowrate is initiated through orifice 73 passing through the fully opened servo port 14 and ultimately to the external vented tank through leakage port 58. Full opening of the throttle port 81 accelerates the flowrate passing through the regulator exit passageway 86 and into the suitable connected downstream system. When flow reaches a restriction which causes the pressure P2 to rise, the increase is reflected in passageway 86 and in the communicated chamber between actuators 30 and 40. This causes servo valve 20 to move to the right and to start closing servo port 14, which in turn reduces servo flow and increases the level of pressure P3 in chamber 77. This causes piston 70 to move and to start closing throttle port 81 reducing flow through the regulator. A state of equilibrium could be said to exist when the level of pressure P2 ceases to increase and becomes stable and when both, servo valve 20 and throttle piston 70 cease in their movements. At this time, the force developed by regulated outlet pressure level P2 satisfies the spring force setting acting on servo valve 20 per the equation:

$$FS = aP2 + k$$

The servo valve in turn restricts servo flow to develop the required P3 pressure level which satisfies the throttle valve force equation:

$$P3A2 = P2A1 + P1(A2 - A1)$$

The position of metering edge 44a of piston land 44 relative to the servo port 14 at this time is known as the null position of the servo valve. The position of throttle piston land 74 relative to throttle port 81 establishes the required port area opening which, by being subjected by the difference in level in pressures P1 and P2, develops the flowrate which attains the regulated pressure level P2 in the external system restriction.

Now consider an operational requirement whereby the flowrate is to be increased by increasing pressure level P2 by regulator adjustment. Using the spring adjustment means 60, spring 12 is further compressed increasing the force applied to servo valve 20 and causing it to move from the null position and further open servo port 14. This increases the servo flow reducing pressure level P3 in chamber 77 and unbalancing piston 70. The piston moves to open the throttle port 81 causing an increased flowrate through the regulator. The regulator regains its equilibrium state at a new throttle piston setting when the regulated pressure P2 reaches the newly set level which causes servo valve 20 to return to its so-called null position with the higher spring force applied.

Now consider the condition whereby the restriction in the external system is increased causing pressure level P2 to increase. As pressure level P2 increases, two simultaneous regulator actions occur which integrate and accelerate the response rate of the regulator. First, servo valve 20 is unbalanced causing it to move from the null position to close the servo port 14. Second, throttle piston 70 is similarly unbalanced causing it to move to open throttle port 81 and to increase the flowrate through the regulator. This evidently acclerates the pressure rise sensed by servo valve 20 causing its faster movement to close servo port 14. Closing of the servo port 14, as previously described, reduces flow through the regulator until a new equilibrium state is again reached and servo valve 20 returns to a null position and the set pressure level P2 is regained.

Now consider the condition whereby all flow is stopped in the downstream system. Regulator operation is as discussed previously, except piston 70 continues movement until it closes throttle port 81. The pressure level P2 at that instant would be within the sensitivity band of the spring adjusted pressure level setting. Leakage, however minute, initiates from throttle port 81 passing through diametral clearances between piston 72 and cylinder bore 78 enters exit passageway 86 and increases pressure level P2. This causes servo valve 20 to continue moving and eventually opens relief port 16 which was covered by piston land 34. Movement continues until an equilibrium condition develops whereby a relief port opening is reached which satisfies the leakage rate entering exit passageway 86. The level increase in pressure P2 at this condition is a function of the added spring deflection from the servo valve null position to the one that satisfies the relief port opening setting.

Any subsequent adjustment reducing spring force will cause a further relief port opening, venting the pressurized P2 passageways and ultimately stabilizing at a lower P2 level when equilibrium is reestablished. This relief port feature is also beneficial in that it will vent any pressure surge whenever fluid flow is drastically stopped in an external system. This would possibly eliminate hammer effects in the system.

SPRING ADJUSTMENT MEANS

The regulator configuration described above could readily be adapted to utilize any number of spring adjustment means. As shown in FIG. 1, spring adjustment means 60 is a motor operated gear driven screw arrangement which traverses a non-rotating spring seat along a guide in the cylinder to change the length of spring 12. Objectively, in the broadest sense, the regulator designs described herein may use any spring adjustment means that can be activated and/or operated manually, electrically, optically, pneumatically, hydraulically or by any other means, to compress, position and/or to deflect the biasing spring in the servo valve assembly.

BACK PRESSURE REGULATOR

In FIG. 2 is described a regulator for controlling pressure level upstream rather than downstream of the regulator in contradistinction to the regulator in FIG. 1. This embodiment of the invention also differs from that in FIG. 1 in that:

1. The orifice through the wall of the motor piston land is replaced with an orifice 162 in passageway 164 interconnecting chamber 151 with servo pressure chamber 153 in throttle valve assembly 200.
2. Throttle port 181 instead of communicating with the regulator inlet passageway is connected to the exit passageway 186. This necessitates providing passageway 176 to transmit pressure P2 to chamber 179 and to act on the appropriate area of throttle piston land 174.
3. The servo valve assembly is changed as follows:
    a. the spring adjustment means is changed from a motor operated type to the manually operated screw type adjustment means 160,
    b. the servo valve assembly is changed to eliminate the leakage chambers and related passageways between piston lands on each actuator as previously described in the servo valve discussion,
    c. the passageways transmitting pressure sources P2 and Pr are interchanged and spring 112 is relocated to apply force to the smaller actuator instead of the larger as previously described.

System flow which is to be regulated at a set pressure level is suitably applied to inlet passageway 182 and passes through chamber 151a and the resultant port 181 opening "throttled" by piston 174 and thence through passageway 186 to a suitably connected vented tank or other low pressure source. Passageway 188 transmits regulated pressure P1 to the exterior chambers 142 and 144 of servo valve assembly 110.

Passageway 164 with incorporated orifice 162 communicates inlet passageway 182 with throttle valve chamber 153 and with servo port 114. Servo flow developed through any opening of servo port 114 passes through chamber 146 and passageway 148 and is exhausted to atmosphere through interface port 149.

It will be observed from the above description of the back pressure regulator shown in FIG. 2 that the regulator will serve to maintain the pressure level of the system fluid source applied to passageway 182 as a function of the compression to which spring 112 is adjusted. A pressure level greater than the set level would cause the servo valve to move against the set spring force closing servo port 114 and causing throttle valve 150 to move and open throttle port 181 and venting the pressure in passageway 182 until equilibrium is regained. Reverse operation would be experienced if a lower pressure level than set level was sensed in passageway 182.

It will also be observed that the regulator defined in FIG. 1 could readily be converted into a back pressure regulator by simply: 1. Relocating passageway 88 and connected passageway 53 to communicate with inlet passageway 82, 2. Relocating servo port 14 to be throttled by piston metering edge 44b instead of 44a, and
3. Eliminating relief port 16 and connected passageway way 51.

FLOW REGULATOR

The general equation for volumetric flowrate passing through an orifice is:

$$Q = kA\sqrt{\Delta P}$$

where:

Q=Flowrate, volume per time
k=a constant
ΔP=Pressure loss across orifice, force per area Volumetric flow is therefore dependent upon the two variables, orifice area and pressure levels across the orifice. It is also evident that a constant flowrate would result if a constant pressure loss is maintained across a fixed orifice area.

Figure 3:
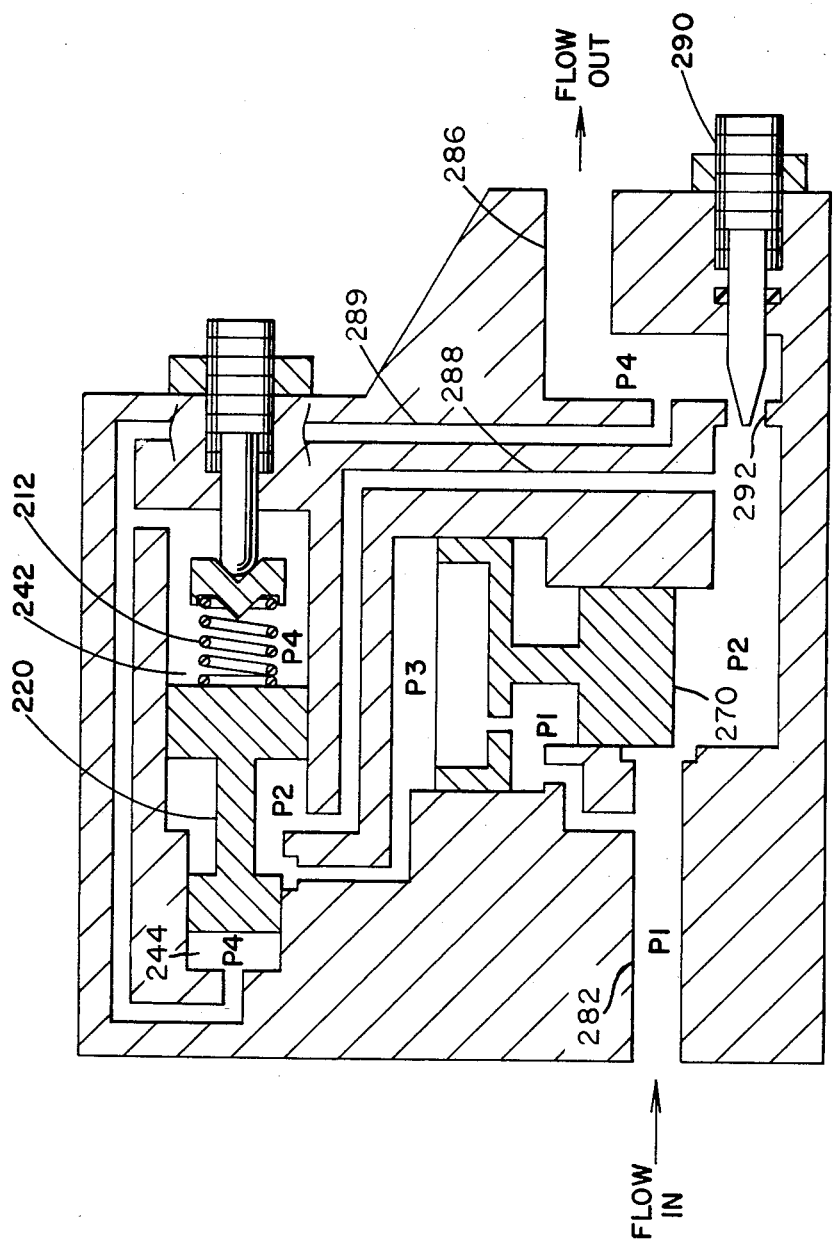
FIG. 3 is a cross-sectional schematic view through a flow regulator according to the present invention.

A flow regulator embodying the invention is shown in FIG. 3. This regulator will maintain or schedule a desired flowrate at the discharge side of the regulator in relation to an orifice area setting, fixed or varying, and in relation to the maintenance of a pressure loss setting, fixed or varying, across the orifice.

Flow enters in the direction of the arrow in passageway 282 and leaves the regulator through exit passageway 286. This flow regulator uses the same components previously described above in connection with the pressure regulators depicted in FIG. 1 and FIG. 2, and for this reason, a structural description thereof would be repetitious and unnecessary. The flow regulator includes, however, several additional features not present in the previously described pressure regulators, namely, an orifice 292 in passageway 286 downstream of interconnecting P2 pressure sensing passageway 288, an orifice area adjustment means 290, and passageway 289 which communicates passageway 286 downstream of orifice 292 with the exterior "reference" pressure chambers 242 and 244 of servo valve 220. With this arrangement of orifice 292 and passageway 289, the servo valve 220 will sense the pressure loss or drop caused by the flow through orifice 292 and will endeavor to maintain a definite pressure loss, as set by the compression of spring 212, by the throttling action of throttle piston 270. Pressure level variations upstream or downstream of the regulator will not affect the delivery of the scheduled flowrate provided the difference between the inlet source pressure level in passageway 282 and the exit pressure level leaving the regulator is, at any instant, always greater than the pressure loss setting across the orfice.

Orifice area adjustment means 290 depicted in FIG. 3 is simply a manually operated screw driven tapered shaft which can traverse within the center of the orifice thereby varying the area setting by changing the relating distance between the tapered surface and the orifice parimeter. As in the case for the servo spring adjustment means, the flow regulator designs described herein can be adapted to use any number of orifice area adjusting techniques. Any means, operated or powered manually, electrically, hydraulically and et cetera, can be used provided that the resultant area setting is structurally stable and physically unaffected by the flow or pressures imposed.

Figure 4:
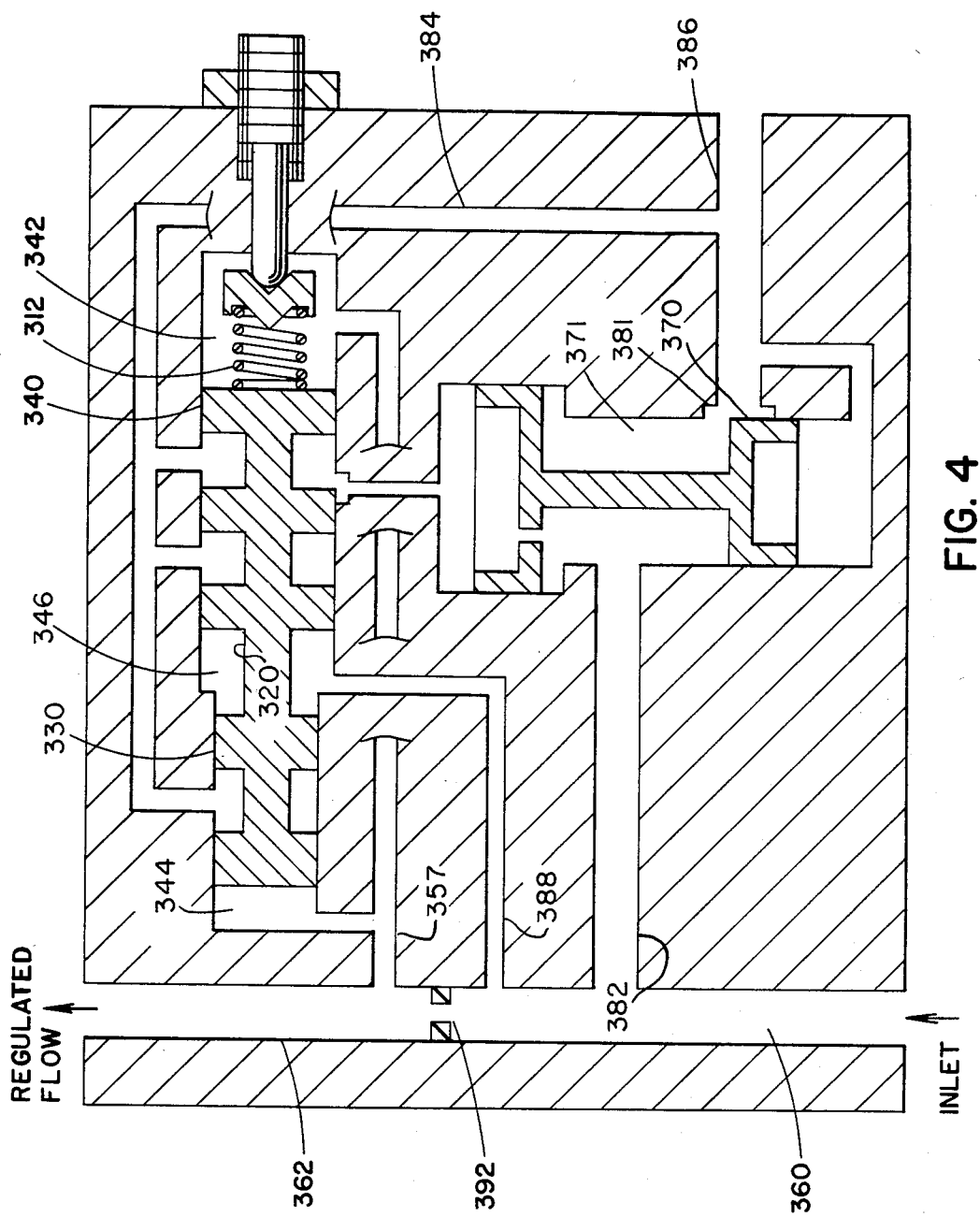
FIG. 4 is a cross-sectional schematic view through an alternate flow regulator according to the present invention.

The flow regulator illustrated in FIG. 4, in contradistinction to that in FIG. 3, regulates fluid flow rate at the upstream side of the regulator and is more suitable for applications using incompressible fluids pressurized by positive displacement pumping elements. This regulator uses alternate throttle valve and servo valve design configurations for those shown in FIG. 3 and these have been previously described in the FIG. 1 and FIG. 2 pressure regulator discussions. The regulator in FIG. 4 differs from that in FIG. 3 mainly by the addition of a regulator inlet passageway 360, a regulator exit passageway 362, by the inclusion of fixed area orifice 392 between the two passageways, and relocation of other pertinent passageway as noted herein. A branch passageway 382 communicates inlet passageway 360 to chamber 371 formed between respective piston lands of throttle piston 370. Passageway 388 communicates passageway 360 to servo valve chamber 346 between the two respective actuators 330 and 340. Passageway 357 communicates passageway 362 to the exterior servo valve chambers 342 and 344. Passageway 384 communicates the three leakage chambers between the respective piston lands on actuators 330 and 340 to the return passageway 386.

The regulator in FIG. 4 functions generally in the following manner. Unregulated flow, at a rate capacity always greater than that required by the downstream using system, is suitably applied into inlet passageway 360. Regulated flow at a set rate passes through orifice 392 and is discharged through exit passageway 362 to a suitably connected system utilizing such flowrate. Excess flowrate in passageway 360 is transmitted by branch passageway 382 through the throttle valve and into return passageway 386 and thence to a suitably connected vented tank or other low pressure source.

It will be observed from the above description of the flow regulator in FIG. 4, that the regulator will serve to maintain a set pressure loss across the fixed area orifice as a function of the compression of spring 312 and thus provide a set flowrate through the exiting passageway 362.

It should also be observed that the single orifice shown in FIG. 3 and FIG. 4 can be replaced with two or more independently operated adjustable type orifices arranged in series and/or parallel but within the confines between the two sensing passageways communicated to the respective servo valve chambers. Such regulator would provide or schedule a flowrate based on the effective area of the total number of orifices in the system without being affected by pressure variations or fluctuations upstream or downstream of the regulator.

A possible application for such a regulator could be a fuel control for a jet engine. An adaptation of the regulators used in FIG. 3 or FIG. 4 could be devised using at least three area controlled orifices in series in the main passageway between the two interconnecting passageways sensing the pressure levels across the three orifices. One primary orifice area is scheduled by an engine speed setting parameter, another orifice area downstream is scheduled by an engine pressure parameter and the third orifice area downstream is scheduled by an engine temperature parameter. The speed controlled orifice would be the effective orifice area for the regulator provided the speed schedule did not exceed either the engine pressure limit schedule or the engine temperature limit schedule. If subsequent engine power demands at the set speed condition causes either the pressure limit or temperature limit to be reached, the applicable parameter controlled orifice area becomes the effective area for the regulator and would control fuel flow to the engine as required to maintain operation at the scheduled limit condition for the particular parameter.

SINGLE STAGE REGULATORS

Many industrial process applications do not require the accuracy and wide range operating capability of the two stage servo operated regulators discussed above. The servo valve assembly configurations utilized for the aformentioned two stage regulators are in themselves single stage regulators which could be easily and economically adapted to satisfy such process applications. These single stage regulators provide a significant performance improvement over current available single stage regulators because of the use of the low force, low spring rate for pressure setting requirements. This is particularly true and evident for very high pressure applications in the area of 5000 psig or 10,000 psig range.

BACK PRESSURE REGULATOR—SINGLE STAGE

Figure 5:
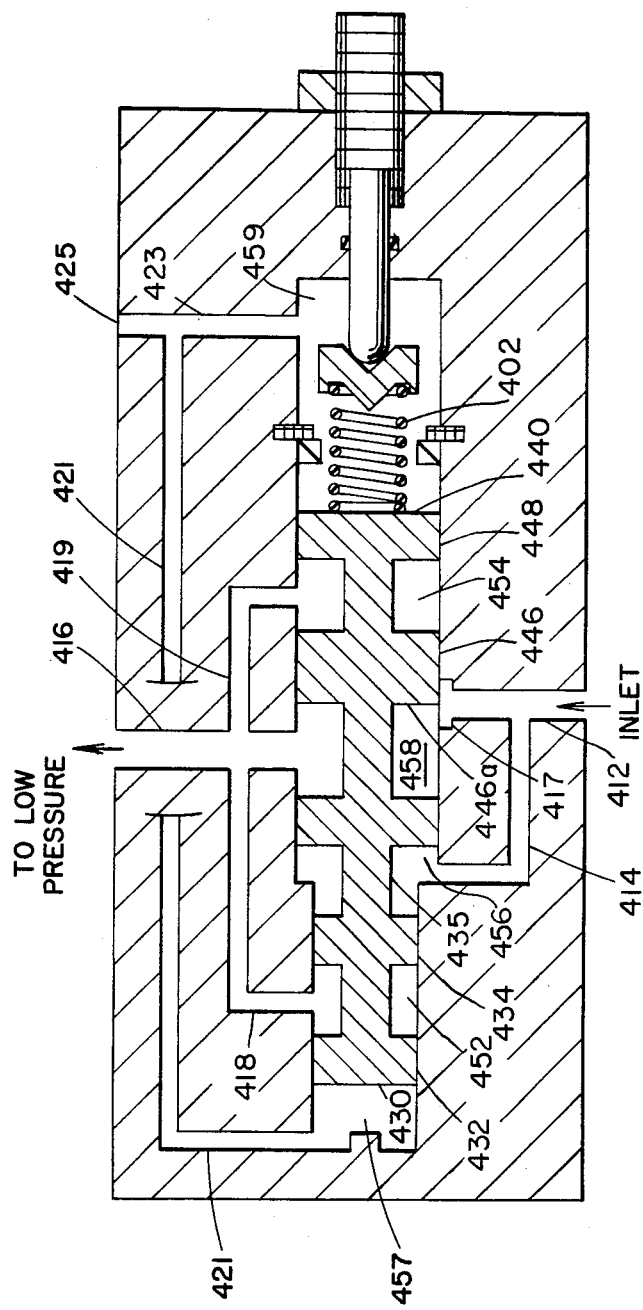
FIG. 5 is a cross-sectional schematic view through a single stage back pressure regulator according to the present invention.

In FIG. 5 is described a single stage back pressure regulator adapted from the servo valve configuration described in FIG. 1. This regulator will control system pressure upstream of the regulator and is applicable for processes utilizing fluid flow at applicable "constant" pressure levels at flow rates less than the capacity of the positive displacement type pumps used in the system. This regulator would be ideally applicable for controlling the pressure between the pump and the nozzle of a high pressure water spray or drill. Water flow at 10,000 psig upstream of a nozzle will drill through rock and marble. At pressures between 3000 psig and 5000 psig, water spray will strip paint from metal sheeting or will remove a finite thickness of brick or granite facing as required to clean building exteriors. These processes do not require the performance capability of the two stage regulators previously discussed. Nozzles in these systems are usually incorporated at the end of a hand held flexible hose equipped with a hand operated valve to shut off fluid flow through the nozzle when necessary.

Consider that the fluid pressure source between the pump and spray nozzle of such a water spray system is suitably connected to inlet passageway 412 of the regulator shown in FIG. 5. The excess fluid flow not utilized by the nozzle spray is transported to contoured throttling port 417 at the end of passageway 412. Passageway 414 interconnects passageway 412 with pressure sensing chamber 456 formed between actuators 430 and 440 respectively. Fluid flow passes through the throttling orifice formed between the opened edge of port 417 and metering edge 446(a) of piston land 446 on actuator 440 and flows through chamber 458 into exit passageway 416. A suitable piping connection would be used to transport the excess flow to the external system's vented supply tank. Passageways 418 and 419 interconnect exit passageway 416 with chambers 452 and 454 formed between respective piston lands 432 and 434 on actuator 430 and between piston lands 446 and 448 on actuator 440. These chambers, as previously noted for similar applications, intercept possible leakage from the high pressure sensing chamber 456 and from throttle port 417 and prevent the leakage from entering into the reference pressure sensing chambers 457 and 459 respectively. Chambers 457 and 459 are interconnected by passageways 421 and 423 and terminate at reference pressure port 425. A suitable piping connection can be used to connect an ambient pressure source to port 425. A connection in the ullage portion of the systems vented supply tank or even several inches below the liquid level in the tank could be used for this purpose. The force developed by compressing spring 402 provides the means for setting the regulators operating pressure level.

As an example of the operating capabilities of a single stage back pressure regulator according to the above description for use in a 5000 psig water spray application, let the following be assumed:

Dia. of actuator $440 = D_1 = 0.6250$ inches
Bore dia. of actuator $440 = D_{1B} = 0.6251$ inches
Dia. of actuator $430 = D_2 = 0.6229$ inches
Bore dia. of actuator $430 = D_{2B} = 0.6230$ inches
Dia. of rod $435 = D_3 = 0.125$ inches
Spring rate of Spring $402 = SR = 10$ lbs. per inch
Water spray system pump capacity = 6200 PPH (lbs. per hour)
Regulator setting = 5000 psig system pressure level when delivering flow through spray nozzle at 5200 PPH (approx. 10.4 gpm)

To simplify the quantitative analysis, it will also be assumed:

1. The rate of fluid flow through the regulator is in accordance with equation:

$$W_f = 12,000 A_o \sqrt{\Delta P}$$

Where:
$W_f$ = flow rate in PPH
$A_o$ = Throttle port open area in square inches
$\Delta P$ = pressure loss across throttle port opening in lbs per square inches 2. The fluid pressure loss through chamber 456, exit passageway 416 and connecting piping to the system's ambient vented supply tank is negligible for all flow conditions.

3. Ambient atmospheric pressure from the vented supply tank is supplied to port 425 and to chambers 457 and 459.

When 5200 PPH flow is expelled through the spray nozzle, the regulator must by-pass 1000 PPH flow (6200–5200 PPH) to the system tank. The initial opening area through throttle port 417 must be:

$$A_{01} = \frac{W_f}{12000 \sqrt{\Delta P1}} = \frac{1000}{12000 \sqrt{5000}} = .0011785 \text{ IN}^2$$

Assume that the contoured throttle port 417 is comprised of four interconnected rectangular slots equally spaced about the circumference of the bore in chamber 458 and that the total equivalent width of the four slots is equal to one third of the circumference of the chamber bore and that the length of the slots are 0.437 inches long along the horizontal centerline of the assembly. The initial length of the port 417 slot openings when 1000 PPH is flowing is therefore:

$$L1 = \frac{A_{O1}}{\frac{\pi D_{1B}}{3}} = \frac{.0011785}{\frac{\pi(.6251)}{3}} = .00180 \text{ inches}$$

The initial spring force imposed by spring 402 to develop the 5000 psig pressure setting is calculated from an equation similar to that previously defined in the servo valve discussion section.

$$F_{S1} = P_1(A_4 - A_3) - P_r(A_7 - A_1)$$

Considering:
P$_1$=5000 psig
P$_r$=0 psig
$A_4 = (\pi/4)(D_2{}^2 - D_3{}^2)$
$A_3 = (\pi/4)(D_2{}^2 - D_3{}^2)$
Combining and rearranging:

$$F_{S1} = 5000(\pi/4)(D_1{}^2 - D_2{}^2)$$

Based on previously defined D$_1$ and D$_2$ values $$F_{S1} = 5000\left(\frac{\pi}{4}\right)\left(\frac{2}{.6250} - \frac{2}{.6229}\right) = 10.291 \text{ lbs.}$$

The initial spring compression necessary to develop this force is:

$$C_1 = \frac{F_{S1}}{SR} = \frac{10.291 \text{ lbs}}{10 \frac{\text{lbs}}{\text{in}}} = 1.0291 \text{ inches}$$

The regulator must accomodate and by-pass the full system pump capacity of 6200 PPH flow to the tank when flow through the nozzle is stopped. The operating conditions of the regulator can be established for this new flow condition by simultaneously solving the following equations:

(Note, subscript 2 defines the applicable parameters at the new flow conditions.)

$$A_{02} = \frac{W_{f2}}{12000 \sqrt{\Delta P_2}} = \frac{6200}{12000 \sqrt{\Delta P_2}} \quad (1)$$

$$L_2 = \frac{A_{02}}{\frac{\pi D_{1B}}{3}} = \frac{A_{02}}{\frac{\pi(.6251)}{3}} \quad (2)$$

$$F_{S2} = F_{S1} + \Delta F_S = F_{S1} + (L_2 - L_1)SR \quad (3)$$

$$F_{S2} = 10.291 + (L_2 - .00180)\left(10 \frac{\text{lbs}}{\text{in}}\right)$$

$$\Delta P_2 = \frac{F_{S2}}{\frac{\pi}{4}(D_1{}^2 - D_2{}^2)} = \frac{F_{S2}}{\frac{\pi}{4}((.6250)^2 - (.6229)^2)} \quad (4)$$

Simultaneously solving the above equations results in the following:
ΔP$_2$=5045.2 psig A$_{02}$=0.007274 in$^2$
L$_2$=0.01111 inches
F$_{S2}$=10.3841 lbs.

The regulator would only develop an increase of less than 1% in pressure setting (from 5000 psig to 5045.2 psig) when flow through increases from 1000 PPH to 6200 PPH. This is a significant improvement over present available single stage regulators for the noted pressure setting and flow range operating conditions. In fact, an expensive two stage regulator of conventional design would be required to approach this "droop" characteristic of less than 1% for the same conditions.

It should also be noted that when the throttle port 417 is opened for the full 0.437 inch length, the pressure loss through the port at 6200 PPH flow would be $$\Delta P = \left(\frac{W_f}{12000 A_0}\right)^2 = \frac{6200}{12000(.437)\frac{(\pi[.6251])}{3}} = 3.26 \text{ psi}$$

The regulator would then have a pressure setting adjustment range between 4 psig to over 5045 psig provided the spring adjustment means (which compresses the spring) has a working range in excess of:

$$C_2 = \frac{F_{S2}}{SR} = \frac{10.3841}{10} = 1.038 \text{ inches}$$

It should be noted that the servo valve assembly shown in FIG. 1 would be identical in configuration with the single stage back pressure regulator if the following changes were made: (Ref. FIG. 1.)
1. Relief port 16 and passageway 51 are eliminated.
2. Passageway 88 relocated to interconnect passageway 89 with passageway 53 and is designated inlet passageway.
3. Servo port 14 enlarged and relocated to be throttled by piston metering edge 44b.

Physically the regulator in FIG. 5 would be longer and larger to accomodate the much larger flowrates through the passageways and the much larger throttle port.

SINGLE STAGE PRESSURE AND FLOW REGULATORS

Figure 6:
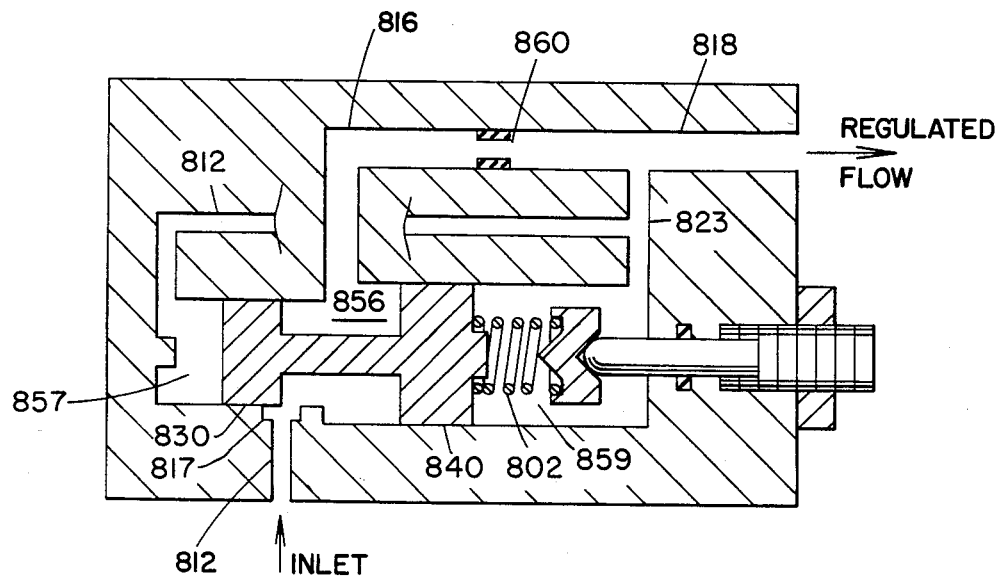
FIG. 6 is a cross-sectional schematic view through a single stage flow regulator according to the present invention.

It should be evident that, in like manner, single stage pressure and flow regulators could be created by adapting any servo valve configuration described herein for the two stage regulators. In FIG. 6 is described a single stage flow regulator based on an adaptation of the servo valve assembly in FIG. 3. Note that fluid pressure in passageway 816 upstream of orifice 860 is also applied in chamber 856 formed between actuators 830 and 840. The pressure in outlet passageway 818 downstream of orifice 860 is interconnected with chambers 857 and 859 by passageways 821 and 823 respectively. Piston land 830 will vary the opening of port 817 located at the end of inlet passageway 812 to maintain a set pressure loss across orifice 860 as established by the compression setting of spring 802.

Figure 7:
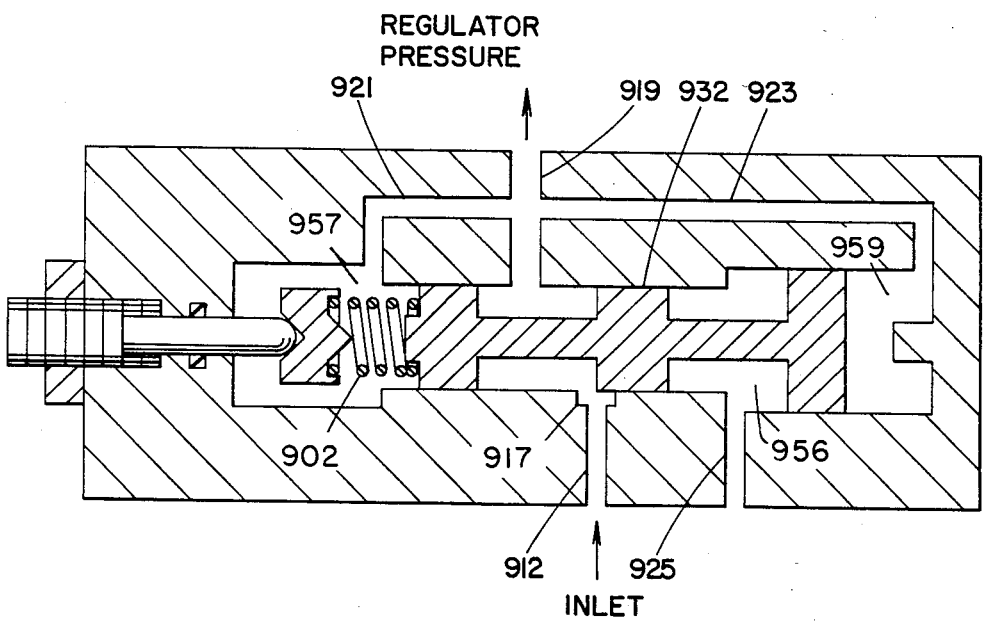
FIG. 7 is a cross-sectional schematic view through a single stage pressure regulator according to the present invention.

In FIG. 7 is described a single stage pressure regulator adapted from the servo valve assembly in FIG. 2. Chambers 957 and 959 are connected to regulated pressure outlet 919 by passageways 921 and 923 respectively. A desired reference pressure source is suitably connected to passageway 925 and is applied into chamber 956. This regulator will position piston land 932 to throttle fluid flow passing through port 917 at the end of inlet passageway 912 to maintain a fluid pressure level in outlet 919 as set by the compression of spring 902.

These single stage regulators will have a "droop" characteristic and the set flow or pressure level will not be as accurate as that attainable with the two stage regulators previously described. They will, however, be more economical for applications not requiring such accuracy or range capability.

SUMMARY OF ADVANTAGES OF THE INVENTION

1. Single unitized servo valve assembly.
2. Highly Accurate—low force, low rate springs used for pressure sensing applications for any pressure level, no seals used on servo or throttle valves.
3. Unlimited Pressure Level Application—no diaphragms, bellows or thin sectioned membranes used.
4. Very Responsive—regulation very responsive due to low spring rate (force/deflection) of spring used in servo valve assembly.
5. Highly Reliable—Design uses no thin section membranes, bellows, etc., that are subject to high fatigue type stresses and which are usually the cause of most regulator failures.

What is claimed is:

1. A fluid flow regulator, comprising:
   a housing within which a fluid flow passageway is defined through which a fluid flow to be controlled moves, a servo valve passage and a throttle valve passage connecting the fluid flow passageway to the servo valve passage;
   throttle valve means mounted within the throttle vale passage to control the flow through the fluid flow passageway; and
   servo valve means mounted within the servo valve passage, said servo valve means including
   an axially spaced pair of actuators defining with said servo valve passage a pressure chamber at each end of the actuators subjected to a reference pressure and a pressure chamber between the actuators, each actuator comprising at least two axially spaced pistons between which at least one pressure chamber is defined;
   biasing means situated within a pressure chamber at one end of the actuators for exerting a biasing force against the actuators; and
   means defining a leakage port, wherein:
   (i) said actuators each including at least a pair of spaced apart surfaces exposed, respectively, to an end pressure chamber and the pressure chamber between the actuators, the spaced apart surfaces of one actuator defining a greater pressure area than the spaced apart surfaces of the other actuator.
   (ii) said actuators are joined together to move as a unit in said servo valve passage in response to the resultant force generated by the pressures in said pressure chambers and said biasing means;
   (iii) one of said actuators is situated to directly control, in response to said resultant force, the opening of the throttle valve passage at the servo valve passage; and
   (iv) the pressure chambers defined between the spaced pistons of each actuator are connected to the means defining the leakage port and subjected to the same pressure which is equal to or less than the reference pressure.

2. The fluid flow regulator as defined in claim 1, further comprising:
   means defining a relief port controlled by said servo valve means.

3. The fluid flow regulator as defined in claim 2, further wherein:
   (v) said means defining the relief port is connected to said passageway.

4. The fluid flow regulator as defined in claim 2, further wherein:
   (v) said means defining the relief port is connected to the pressure chamber defined between said actuators.

5. The fluid flow regulator as defined in claim 1, further comprising:
   means connected to apply a reference pressure to both ends of said servo valve means.

6. The fluid flow regulator as defined in claim 1, further wherein:
   (v) the biasing means is adjustable.

7. The fluid flow regulator as defined in claim 1, further wherein:
   (v) the pressure chamber defined between said actuators is connected to said fluid flow passageway downstream of said throttle valve means.

8. The fluid flow regulator defined in claim 7, further wherein:
   (vi) the connection of the pressure chamber defined between said actuators to said fluid flow passageway comprises a further passageway including throttle means therein.

9. A fluid flow regulator, comprising:
   a fluid flow passageway through which the fluid flow to be controlled moves;
   throttle valve means connected to said passageway to control flow therethrough;
   servo valve means connected to said passageway and to said throttle valve means, said servo valve means including:
   (a) an axially spaced pair of actuators, joined together to move as a unit, between which pressure chamber is defined; and
   (b) biasing means for exerting a biasing force against the actuators; and
   means defining a relief port controlled by said servo valve means, wherein:
   (i) one of said actuators is situated to control the connection of said servo valve means to said throttle valve means;
   (ii) the pressure chamber defined between said actuators is connected to said passageway; and
   (iii) each actuator comprises at least two axially spaced pistons, with a piston of one actuator defining a control edge which controls the connection of said servo valve means to said throttle valve means, and a piston of the other actuator defining a control edge which controls the relief port.

10. The fluid flow regulator as defined in claim 9, further wherein:
    (iv) the relief port is situated relative to the connection of said servo valve means to said throttle valve means such that the relief port is closed when the connection of said servo valve means to said throttle valve means is open, and open when the connection of said servo valve means to said throttle valve means is closed.

11. A fluid flow regulator, comprising:

a fluid flow passageway through which the fluid flow to be controlled moves;

throttle valve means connected to said passageway to control flow therethrough;

servo valve means connected to said passageway and to said throttle valve means, said servo valve means including:
  (a) an axially spaced pair of actuators, joined together to move as a unit, between which a pressure chamber is defined; and
  (b) biasing means for exerting a biasing force against the actuators; and means defining a relief port controlled by said servo valve means, wherein:
  (i) one of said actuators is situated to control the connection of said servo valve means to said throttle valve means;
  (ii) the pressure chamber defined between said actuators is connected to said passageway;
  (iii) said means defining the relief port is connected to said passageway;
  (iv) each actuator comprises at least two axially spaced pistons between which a pressure chamber is defined;
  (v) the pressure chambers defined between the spaced pistons are subject to the same pressure;
  (vi) the pressure chamber defined between said actuators is connected to said passageway downstream of said throttle valve means; and
  (vii) each actuator comprises at least two axially spaced pistons, with a piston of one actuator defining a control edge which controls the connection of said servo valve means to said throttle valve means, and a piston of the other actuator defining a control edge which controls the relief port.

12. The fluid flow regulator as defined in claim 11, further wherein:
  (viii) the relief port is situated relative to the connection of said servo valve means to said throttle valve means such that the relief port is closed when the connection of said servo valve means to said throttle valve means is open, and open when the connection of said servo valve means to said throttle valve means is closed.

* * * * *